United States Patent Office 2,788,456
Patented Apr. 9, 1957

2,788,456
CONDUCTOR-VENTILATED GENERATORS

Marvin M. Fromm, Pittsburgh, Pa., assignor to Westinghouse Electric Corporation, East Pittsburgh, Pa., a corporation of Pennsylvania Application September 28, 1954, Serial No. 458,881

5 Claims. (Cl. 310—64)

My invention relates to conductor-ventilated synchronous generators, which are usually large high-voltage high-speed turbine-generators in which relatively lightly insulated conductors are directly cooled by the flow of a cooling medium in relatively good thermal contact with the conductors, in both the stator and rotor members. My present invention has particular relation to the stator winding of such a machine, in which lightly insulated transposed contactor-strands are directly cooled by one or more stacks of open-ended cooling-ducts which are disposed, with the strands, inside of a solid, continuous, major-insulation sheathing which has the property of a dielectric barrier. The ducts are usually and preferably made of lightly insulated high-resistance metal, having sufficient mechanical strength to withstand the pressures which are usually employed in the application and compacting of the insulating sheathing, as set forth in an application of R. A. Baudry and P. R. Heller, Serial No. 248,852, filed September 28, 1951.

When such a generator is designed for an unusually high voltage-rating of the stator winding, and even at only moderately high-voltage ratings when the generator is given its over-voltage shop-tests, difficulty may be encountered as a result of corona discharging out of the ends of the stator-winding ventilating-ducts, which draws enough current to disturb the capacity-coupled voltage-levels of the several ducts, causing insulation-breakdown of the relatively light duct-insulation which surrounds the individual ducts. This is a new and unexpected problem, which is overcome by my present invention.

With the foregoing and other objects in view, my invention consists in the systems, structures, combinations, parts, and methods of design and operation, as hereinafter described, and illustrated in the accompanying drawing, wherein.

Figure 1:
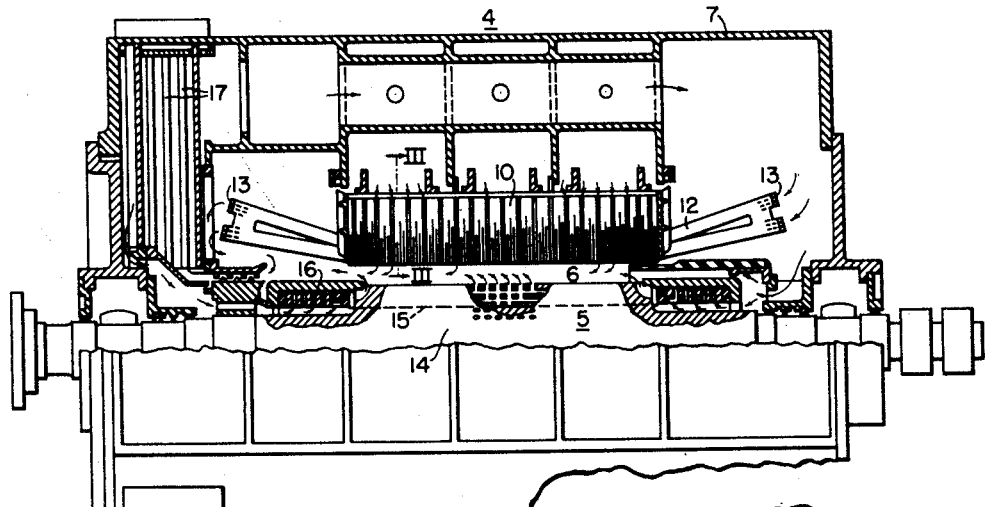
Figure 1 is a side-elevational view, the top half being in longitudinal section, showing an illustrative hydrogen-cooled turbine-generator of a type to which my invention is applied.

Fig. 1 shows a turbine-generator, which is illustrative of a dynamo-electric machine having a cylindrical-bore stator member 4, and a cylindrical rotor member 5, separated by an air gap 6. The stator member 4 includes a substantially hermetically sealed or gas-tight housing 7 which encloses the stator and rotor members, and which is provided with a gaseous filling, which is preferably hydrogen at a gas-pressure which is adapted, at times, to be at least as high as 30 pounds per square inch, gauge, and which may be considerably higher than this pressure.

The stator member 4 comprises a cylindrical core 10 having a plurality of winding-receiving stator-slots 11. The stator member also comprises an alternating-current stator-winding 12, having coil-sides which are disposed within the slots 11, and coil-ends lying beyond the respective ends of the stator-core 10. The stator-winding 12 has a plurality of half-coil portions, each comprising one or more stacks of open-ended ventilating-ducts having duct-ends 13 which are illustrated, in Fig. 1, as extending out beyond the ends of the several half-coil portions of the stator-winding. These stator-ducts are used for substantially directly cooling the conductors which comprise the stator-winding 12, with a relatively good heat-exchange between the ducts and the winding.

The rotor member 5 comprises a cylindrical rotor-core 14 having a plurality of winding-receiving rotor-slots 15. The rotor member also comprises a conductor-ventilated direct-current rotor-winding 16, which serves as a field-winding for the turbine-generator. This field-winding 16 has a very much lower voltage than the stator-winding 12, so that the field-winding conductors are provided with only a relatively light or low-voltage insulation. The lightly insulated rotor field-winding 16 is directly cooled by circulating hydrogen, in any desirable manner, as indicated by the arrows in Fig. 1.

In the machine which has been chosen for illustration in Fig. 1, the high-pressure hydrogen is used to cool both the stator and rotor-windings 12 and 16, this hydrogen being circulated in any desirable manner, as indicated by the arrows, and being cooled by one or more coolers 17 in any suitable manner. The particular cooling-system which is illustrated in Fig. 1 is that which is set forth in a companion application of R. A. Baudry, Serial No. 389,349, filed October 30, 1953 now Patent No. 2,707,242. This is shown merely by way of illustration of a suitable ventilating-system.

Figure 2:
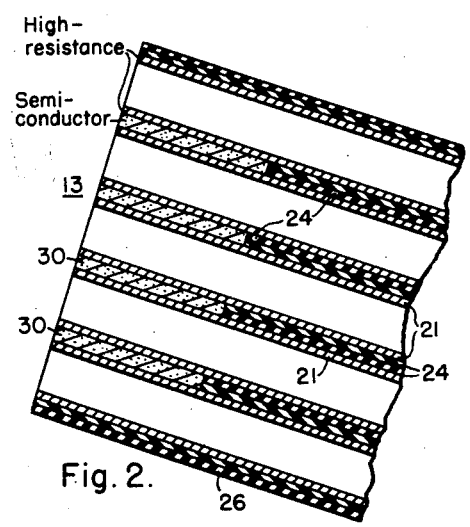
Fig. 2 is an enlarged fragmentary vertical sectional view through one end of a stack of ducts, such as are shown in Fig. 1.
Figure 3:
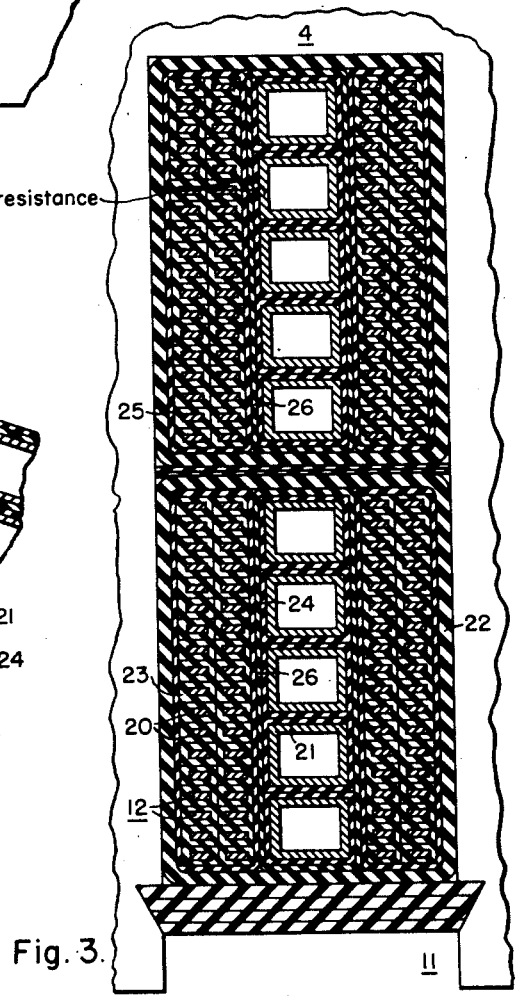
Fig. 3 is a transverse sectional view through the stator-conductor winding-portions which lie within one of the stator-slots, the section-plane being indicated, for example, by the line III—III in Fig. 1.

As shown in Fig. 3, each half-coil portion of the stator-winding 12 comprises a plurality of stacks of transposed, lightly insulated conductor-strands 20, and one or more stacks of high-resistance, lightly insulated, rectangular cross-sectioned, open-ended ventilating-ducts 21, and a solid, continuous, major-insulation sheathing 22, with dielectric-barrier properties, surrounding the strands and the ducts. The light or relatively low-voltage insulation is very much exaggerated in thickness in Figs. 2 and 3, which are not at all drawn to scale. Each individual strand 20 carries an individual light insulation 23, which may be of 6 or 7 mils thickness, more or less, and which is capable of withstanding perhaps 600 volts, more or less. In like manner, each individual duct 21 carries a light individual insulation 24, which may be of similar thickness and voltage-rating. In many cases, the strands 20 of each half-coil are disposed in two strand-assemblies, one disposed on each side of the centrally disposed stack of ducts 21, each strand-assembly comprising two stacks of transposed conductor-strands 20, each of these strand-assemblies being provided with a light tape-wrapping 25. In like manner, the stack of ducts 21 may be conveniently supplied with a light tape-wrapping 26. These tape-wrappings 25 and 26 facilitate the handling and assembling of the half-coil portions of the stator-winding 12. The massive insulating sheathings 22, on the other hand, are designed to safely withstand the high voltage of the stator-winding conductor-strands 20, which may have a rated voltage of from 10,000 to 24,000 volts, or even higher, with a sheathing-rating high enough to withstand considerably higher test-voltages for a limited time.

As thus far described, and as shown in the Baudry-Heller application, each cooling-duct 21 of the stack of ducts which cools any given half-coil portion of the stator-winding 12 is completely insulated from every other duct of that stack, and from the surrounding conductor-strands 20, by a thin thickness of insulation, so that the ducts are capacity-coupled to each other and to the relatively high voltage of the conductor-strands with which they are associated. Heretofore, the ducts have had a sort of floating potential, determined by this coupling, this floating potential being very slightly modified by the flux-leakage across the stator-slots 11.

It will be understood that the rotation of the machine generates an end-to-end voltage of something like 1,000 volts, more or less, in each of the strands 20 and in each of the ducts 21, this voltage being somewhat lower at the bottom portions of the slots, than at the top, due to the slot-leakage. Thus, the generated voltage in the top strand or duct of each half-coil portion may be some 10 to 20 volts greater (more or less), than the voltage generated in the lowermost strand or duct of that coil-side. This is the reason why the conductor-strands 20 are commonly transposed, so as to avoid eddy currents in the winding-conductors. This is also the reason why the ducts 21 are commonly made of high-resistance material, to reduce their eddy-current losses, as set forth in the Baudry-Heller application. A metallic material is chosen for the ducts 21, in order to provide the necessary mechanical strength to permit the consolidation of the outer sheathing 22, as also set forth in the Baudry-Heller application.

As stated at the beginning of this specification, the voltage of the stator-winding 12 is, at least at times, sufficiently high to run the risk of causing a deleterious voltage-distribution between at least some of the ducts 21 of each half-coil portion, if the duct-voltages are permitted to be controlled preponderantly by the capacitor-couplings from duct to duct and from at least some of the ducts to at least some of the strands. This deleterious voltage-distribution of the ducts usually results from corona which may stream off from one or both ends of the stack of ducts 21 of any half-coil portion of the winding, and this corona draws enough current to exceed the normal capacity-coupling current, so as to produce a voltage, from one duct to the next, which may be high enough to cause a breakdown in the between-ducts insulation. When this happens at both ends of two adjacent ducts, an eddy-current path is set up, running longitudinally through one duct, over to the next adjacent duct, and back longitudinally through that adjacent duct to the first duct again, thereby nullifying the advantage of the duct-insulation.

In accordance with my present invention, I provide a means, disposed at at least one of the ends of each half-coil portion, for providing a deliberate electrical connection from duct to duct, whereby to prevent a deleterious voltage-distribution between the ducts, and whereby, at the same time, to prevent these relatively large circulating eddy-currents from duct to duct with their resultant high losses in the stack of ducts. In the preferred form of my invention, which is shown in Fig. 2, the duct-ends 13 extend out beyond the strands 20 and the sheathing 22 at each end of the stator-winding, and I provide, at each end of each of the half-coil portions, a high-resistance connection 30 from duct to duct, between the several duct-ends 13. This high-resistance connection 30 has a resistance bordering on that of a semiconductor, so that it will permit the flow of an electrical current of the order of a milliampere, or even much less, as compared with a capacitance-coupling which might permit the flow of a leakage-current of the order of only microamperes, if the high-resistance connection 30 had not been used. The resistance-connections 30 thus have a resistance which is sufficiently low to prevent a deleterious voltage-distribution between adjacent ducts, and yet the resistance is sufficiently high so that the circulating eddy currents are too small to cause any sensible resistance-losses in the ducts.

Any suitable means for providing such a high-resistance connection 30 might be used, in accordance with the general principles of my invention. In the illustrated form of embodiment, between the adjacent ducts at each of the duct-ends 13, at both ends of the machine, the duct-insulation 24 is stripped back for perhaps an inch, and its space was filled with a thin piece of semi-conducting material 30, the whole stack of ducts then being bound together with the tape-wrapping 26 so as to hold the high-resistance strips or connections 30 in firm contact with the respective ducts 21.

While I have illustrated my invention in but a single illustrative form or embodiment, I wish it to be understood that my invention is susceptible of use in other forms, and I do not desire to be strictly limited to the particular form which is illustrated.

I claim as my invention:

1. A dynamo-electric machine having a cylindrical-bore stator-member having an alternating-current stator-winding; said stator-winding having a plurality of half-coil portions, each comprising a plurality of stacks of transposed, lightly insulated conductor-strands, and one or more stacks of high-resistance, lightly insulated, open-ended ventilating-ducts, and a major-insulation sheathing, with dielectric-barrier properties, surrounding said strands and said ducts; the voltage of the stator-winding being at times sufficiently high to run a risk of causing a deleterious voltage-distribution between at least some of the duct-ends of each half-coil portion, if the duct-voltages were controlled preponderantly by the capacitor-couplings from duct to duct and from at least some of the ducts to at least some of the strands; and means disposed at at least one of the ends of each half-coil portion, for providing an electrical connection from duct to duct, whereby to prevent a deleterious voltage-distribution between the ducts, and whereby at the same time, to prevent high circulating-currents with resultant high losses in the stack of ducts.

2. A dynamo-electric machine having a cylindrical-bore stator-member having an alternating-current stator-winding; said stator-winding having a plurality of half-coil portions, each comprising a plurality of stacks of transposed, lightly inslated conductor-strands, and one or more stacks of high-resistance, lightly insulated, open-ended ventilating-ducts, and a major-insulation sheathing, with dielectric-barrier properties, surrounding said strands and said ducts; the voltage of the stator-winding being at times sufficiently high to run a risk of causing a deleterious voltage-distribution between at least some of the duct-ends of each half-coil portion, if the duct-voltages were controlled preponderantly by the capacitor-couplings from duct to duct and from at least some of the ducts to at least some of the strands; and means, disposed at each end of each half-coil portion, for providing a high-resistance electrical connection from duct to duct, the resistance of said connection being sufficiently low to prevent a deleterious voltage-distribution between the ducts, and the resistance of said connection being also sufficiently high to prevent high circulating currents with resultant high losses in the stack of ducts.

3. A dynamo-electric machine having a cylindrical-bore stator-member having an alternating-current stator-winding; said stator-winding having a plurality of half-coil portions, each comprising a plurality of stacks of transposed, lightly insulated conductor-strands, and one or more stacks of high-resistance, lightly insulated, open-ended ventilating-ducts, and a major-insulation sheathing, with dielectric-barrier properties, surrounding said strands and said ducts, with the ducts extending out beyond the strands and the sheathing at each end of the stator-winding; the voltage of the stator-winding being at times sufficiently high to run a risk of causing a deleterious voltage-distribution between at least some of the duct-ends of each half-coil portion, if the duct-voltages are controlled preponderantly by the capacitor-coupling from duct to duct and from at least some of the ducts to at least some of the strands; and means, disposed at at least one of the ends of each half-coil portion, for providing an electrical connection from duct to duct, whereby to prevent a deleterious voltage-distribution between the ducts, and whereby, at the same time, to prevent high circulating-currents with resultant high losses in the stack of ducts.

4. A dynamo-electric machine having a cylindrical-bore stator-member having an alternating-current stator-winding; said stator-winding having a plurality of half-coil portions, each comprising a plurality of stacks of transposed, lightly insulated conductor-strands, and one or more stacks of high-resistance, lightly insulated, open-ended ventilating-ducts, and a major-insulation sheathing, with dielectric-barrier properties, surrounding said strands and said ducts, with the ducts extending out beyond the strands and the sheathing at each end of the stator-winding; the voltage of the stator-winding being at times sufficiently high to run a risk of causing a deleterious voltage-distribution between at least some of the duct-ends of each half-coil portion, if the duct-voltages were controlled preponderantly by the capacitor-couplings from duct to duct and from at least some of the ducts to at least some of the strands; and means, disposed at each end of each half-coil portion, for providing a high-resistance electrical connection from duct to duct, the resistance of said connection being sufficiently low to prevent a deleterious voltage-distribution between the ducts, and the resistance of said connection being also sufficiently high to prevent high circulating currents with resultant high losses in the stack of ducts.

5. A large high-voltage high-speed alternating-current generator, having a cylindrical-bore stator-member having a conductor-ventilated high-voltage alternating-current stator-winding, and a cylindrical rotor-member having a conductor-ventilated direct-current rotor-winding, and a gas-filled, hermetically sealed housing enclosing said stator and rotor-members; said stator-winding having a plurality of half-coil portions, each comprising a plurality of stacks of transposed, lightly insulated conductor-strands, and one or more stacks of high-resistance, lightly insulated open-ended ventilating-ducts, and a major-insulation sheathing, with dieletric-barrier properties, surrounding said strands and said ducts; the voltage of the stator-winding being at times sufficiently high to run a risk of causing a deleterious voltage-distribution between at least some of the duct-ends of each half-coil portion, if the duct-voltages were controlled preponderantly by the capacitor-couplings from duct to duct and from at least some of the ducts to at least some of the strands; and means, disposed at at least one of the ends of each half-coil portion, for providing an electrical connection from duct to duct, whereby to prevent a deleterious voltage-distribution between the ducts, and whereby, at the same time, to prevent high circulating-currents with resultant high losses in the stack of ducts.

References Cited in the file of this patent
UNITED STATES PATENTS 2,695,368    Kilbourne _____ Nov. 23, 1954